July 30, 1929.   G. T. COOKE   1,722,624
SELF OPENING COTTER KEY MEANS.
Filed Nov. 6, 1928
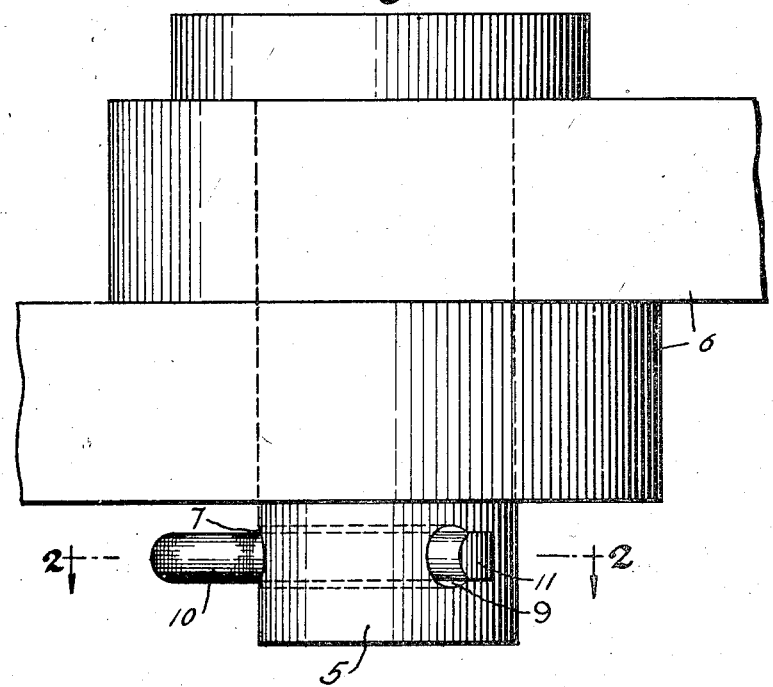
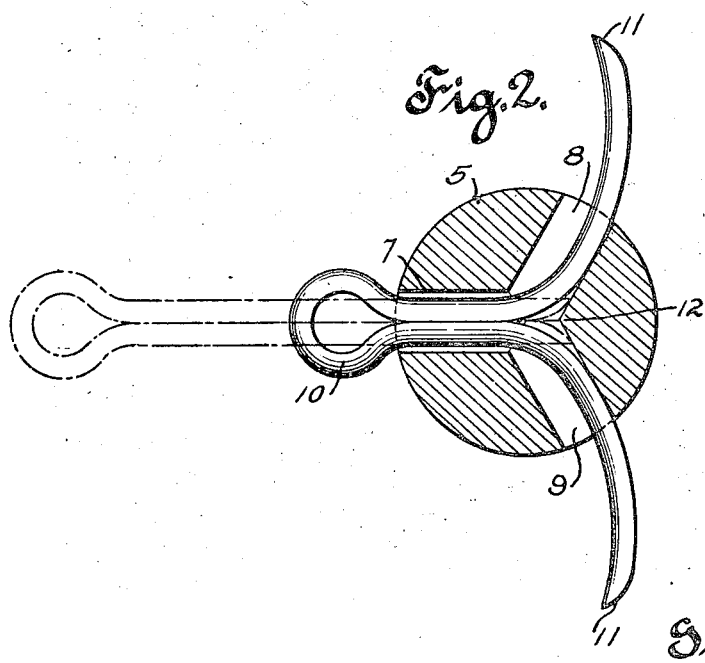
INVENTOR
George T. Cooke
BY
Mitchell & Bechert
ATTORNEYS Patented July 30, 1929.

1,722,624

UNITED STATES PATENT OFFICE.

GEORGE T. COOKE, OF SOUTH NORWALK, CONNECTICUT.

SELF-OPENING COTTER-KEY MEANS.

Application filed November 6, 1928. Serial No. 317,634.

My invention relates to certain new and useful improvements in locks for pins such as studs, bolts and the like.

It is the general object of the invention to provide a pin or the like with cotter key passages so arranged that a cotter key may be entered in any one of a number of passages, and the cotter key automatically spread upon being driven into the passage.

Heretofore, pins and the like, have been provided with a transverse bore intersected by two smaller bores diverging from the point of intersection. Thus, when a cotter key is passed into the main bore and driven inwardly, the legs of the cotter key are spread by the wedge-shaped portion between the said diverging bores. As heretofore manufactured, however, the cotter key must be inserted into the main bore, for, if it be inserted in one of the diverging bores and then driven inwardly, the legs will not always be spread, but both legs of the cotter will curl through one of the other bores and the cotter as a whole will then be of arc shape, and there is great likelihood of its subsequently falling out.

In accordance with my present invention, I obviate the danger heretofore noted and provide the pin or the like, with a plurality of bores so arranged that a cotter pin may be inserted into any one of said bores with the assurance that when the cotter pin is driven in the legs will be spread and pass into diverging bores so that the cotter pin will be safely locked or keyed.

In the drawings which show, for illustrative purposes only, a preferred form of the invention—

Fig. 1 is a view in elevation of a pin for connecting two members and provided with a cotter key for holding the pin in place;

Fig. 2 is a sectional view taken substantially in the plane of the line 2—2 of Fig. 1.

In said drawings, 5 indicates a pin for connecting two parts 6—6. The pin is provided at one end with a plurality of bores, in this case three bores, 7—8—9 which are preferably of the same diameter. These bores are symmetrically arranged and intersect each other within the body of the pin. The bores are so arranged that the axis of each of the bores substantially bisects the angle between two other bores intersecting the first bore. Thus, at the bottom of each bore there is a wedge-shaped portion left between intersecting bores which may serve to spread the legs of a cotter pin.

I prefer to employ a cotter pin 10 having the ends of the legs chamfered as indicated at 11—11, so that when the cotter 10 is inserted through one of the bores such as 7 the chamfered ends 11—11 will engage upon opposite sides of the wedge portion 12, and, upon forcing the cotter pin 10 inwardly as by means of a hammer blow, the legs will be forced through the bores 8—9, and consequently spread substantially as shown more particularly in Fig. 2.

I have illustrated a pin having three symmetrically arranged bores into any one of which the cotter pin may be inserted. The invention is not confined to the provision of only three bores, but other suitable numbers may be provided so long as the wedge-shaped portion is formed at the bottom of and substantially in alignment with the axis of each bore.

The arrangement of the bores as herein disclosed is of great convenience to the mechanic, for the reason that it is unnecessary to seek out any particular bore into which the cotter pin must first be entered. In accordance with my invention, the cotter pin may be entered in any one of the bores with the assurance that the legs will be properly spread upon driving the pin inwardly.

I claim:

1. A pin having an odd number of symmetrically arranged transverse bores therein intersecting each other interiorly of the pin, whereby a wedge-shaped cotter pin opening portion is located interiorly of said pin in alignment with each said bore.

2. A pin having a plurality of transverse bores therein intersecting each other interiorly of the pin, said bores being positioned so that the axis of each bore substantially bisects the angle between two other bores, for the purpose described.

3. A pin having a plurality of transverse bores intersecting interiorly of the pin, said bores being of substantially the same diameter, said bores being positioned so that the axis of each bore substantially bisects the angle between two opposite intersecting bores, whereby a cotter pin may be entered in any one of said bores and the legs thereof spread by passing into said opposite intersecting bores.

GEORGE T. COOKE.